(12) United States Patent
Wang et al.

(10) Patent No.: US 11,598,549 B2
(45) Date of Patent: *Mar. 7, 2023

(54) THERMAL CYCLING SYSTEM AND CONTROL METHOD OF THE THERMAL CYCLING SYSTEM

(71) Applicant: Carrier Corporation, Palm Beach Gardens, FL (US)

(72) Inventors: Xiaohong Wang, Shanghai (CN); Jian Ni, Shanghai (CN); Liang Chang, Shanghai (CN); Hui Zhai, Shanghai (CN); Guangyu Shen, Shanghai (CN); Qing Lu, Shanghai (CN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 302 days.

This patent is subject to a terminal disclaimer.

(21) Appl. No.: 16/839,665

(22) Filed: Apr. 3, 2020

(65) Prior Publication Data

US 2020/0318850 A1  Oct. 8, 2020

(30) Foreign Application Priority Data

Apr. 8, 2019 (CN) .......................... 201910276091.4

(51) Int. Cl.
*F24F 11/84* (2018.01)
*F24F 11/42* (2018.01)
(Continued)

(52) U.S. Cl.
CPC .............. *F24F 11/84* (2018.01); *F24F 3/065* (2013.01); *F24F 11/42* (2018.01); *F24F 2140/12* (2018.01)

(58) Field of Classification Search
CPC ......... F24F 11/84; F24F 11/42; F24F 2140/12
(Continued)

(56) References Cited

U.S. PATENT DOCUMENTS

| 4,338,790 A | 7/1982 | Saunders et al. |
| 5,946,926 A | 9/1999 | Hartman |

(Continued)

FOREIGN PATENT DOCUMENTS

| CN | 1328548 C | 7/2007 |
| CN | 102878613 A | 1/2013 |

(Continued)

OTHER PUBLICATIONS

European Search Report for Application No. 20168795.1; dated Aug. 18, 2020; 8 Pages.

*Primary Examiner* — Md Azad
(74) *Attorney, Agent, or Firm* — Cantor Colburn LLP

(57) ABSTRACT

A heat cycle system and a control method. The heat cycle system includes: driving devices, one or a plurality of outdoor units, and a plurality of indoor units, which are connected by pipelines; a bypass pipeline for the plurality of indoor units, a bypass valve being disposed in the bypass pipeline; a pressure sensor that senses a pressure difference $\Delta P_o$ across the plurality of outdoor units; and a controller that is preset with a pressure difference set value $\Delta P_{set}$, wherein the controller calculates a pressure offset parameter $\Delta P = \Delta P_o - \Delta P_{set}$ and adjusts an opening degree of the bypass valve based on the pressure offset parameter $\Delta P$ so that the pressure offset parameter $\Delta P$ approaches zero, and wherein the controller is preset with a first pressure offset threshold $P_1$, and the controller is configured such that closed indoor units enter a bypass mode one by one when $\Delta P > P_1$, until $\Delta P \leq P_1$.

12 Claims, 2 Drawing Sheets

(51) Int. Cl.
*F24F 3/06* (2006.01)
*F24F 140/12* (2018.01)

(58) Field of Classification Search
USPC .......................................................... 700/276
See application file for complete search history.

(56) References Cited

U.S. PATENT DOCUMENTS

| | | | |
|---|---|---|---|
| 6,666,042 B1 * | 12/2003 | Cline | ............... F25D 17/02 |
| | | | 62/201 |
| 7,004,246 B2 | 2/2006 | Gavula | |
| 7,028,768 B2 | 4/2006 | Aler et al. | |
| 8,006,506 B2 | 8/2011 | Park | |
| 8,091,372 B1 | 1/2012 | Ekern | |
| 9,179,580 B2 | 11/2015 | Tozer | |
| 9,534,806 B2 | 1/2017 | Kim et al. | |
| 9,933,200 B2 | 4/2018 | Qu et al. | |
| 10,941,959 B2 * | 3/2021 | Froemke | ............... F24F 5/0096 |
| 2004/0011505 A1 * | 1/2004 | Park | ........................ F24F 3/06 |
| | | | 165/58 |
| 2005/0039904 A1 * | 2/2005 | Aler | ........................ F24F 3/06 |
| | | | 165/219 |
| 2008/0016890 A1 | 1/2008 | Dominguez | |
| 2011/0192176 A1 * | 8/2011 | Kim | ........................ F24F 3/065 |
| | | | 62/115 |
| 2018/0022185 A1 | 1/2018 | Kawano | |
| 2020/0096238 A1 * | 3/2020 | Hikone | ................... F24F 11/46 |
| 2020/0132314 A1 * | 4/2020 | Kojima | ................... F25B 41/20 |
| 2022/0082313 A1 * | 3/2022 | Ochiai | ................... F25B 41/20 |

FOREIGN PATENT DOCUMENTS

| | | |
|---|---|---|
| CN | 103229006 A | 7/2013 |
| CN | 203036937 U | 7/2013 |
| CN | 104089328 A | 10/2014 |
| CN | 104776630 B | 7/2015 |
| CN | 105004017 A | 10/2015 |
| CN | 106030221 B | 12/2018 |
| EP | 1855070 A2 | 11/2007 |
| EP | 3115707 A1 | 1/2017 |
| EP | 3367010 A1 | 8/2018 |
| JP | H10238842 A | 9/1998 |
| JP | 2003106575 A | 4/2003 |

* cited by examiner

THERMAL CYCLING SYSTEM AND CONTROL METHOD OF THE THERMAL CYCLING SYSTEM

FOREIGN PRIORITY

This application claims priority to Chinese Patent Application No. 201910276091.4, filed Apr. 8, 2019, and all the benefits accruing therefrom under 35 U.S.C. § 119, the contents of which in its entirety are herein incorporated by reference.

FIELD OF THE INVENTION

The present disclosure relates to an air conditioning system, and more particularly, the present disclosure relates to a heat cycle system and a control method for a heat cycle system.

BACKGROUND OF THE INVENTION

Common thermal cycle systems include a pump, a plurality of outdoor units and a plurality of indoor units, which are connected by pipelines. A cooling medium such as water passes through the outdoor units when driven by the pump, and in the outdoor units, it exchanges heat with a refrigerant in a cooling cycle of the outdoor units via a heat exchange device such as a plate heat exchanger. When a flow rate of the cooling medium passing through the outdoor units is lower than a set value, such as 70% of a rated flow rate, there is a risk that the cooling medium will freeze in the outdoor units. Therefore, a bypass pipeline may be provided so that a part of the cooling medium does not pass through the indoor units, thereby ensuring the flow rate of the cooling medium flowing through the outdoor units.

SUMMARY OF THE INVENTION

An object of the present disclosure is to solve or at least alleviate problems existing in the related art.

According to some aspects, a thermal cycle system is provided, which includes: driving devices, one or a plurality of outdoor units, and a plurality of indoor units, which are connected by pipelines; a bypass pipeline for the plurality of indoor units, a bypass valve being disposed in the bypass pipeline; a pressure sensor that senses a pressure difference $\Delta P_o$ across the plurality of outdoor units; and a controller that is preset with a pressure difference set value $\Delta P_{set}$, wherein the controller calculates a pressure offset parameter $\Delta P = \Delta P_o - \Delta P_{set}$ and adjusts an opening degree of the bypass valve based on the pressure offset parameter $\Delta P$ so that the pressure offset parameter $\Delta P$ approaches zero, and wherein the controller is preset with a first pressure offset threshold $P_1$, and the controller is configured such that the closed indoor units enter a bypass mode one by one when $\Delta P > P_1$, until $\Delta P \leq P_1$.

In some embodiments of the thermal cycle system, the controller is preset with a predetermined bypass number $N_0$ of the indoor units, and the controller is configured to compare a load-based operating number $N_1$ of the indoor units with the predetermined bypass number $N_0$ when $\Delta P > P_1$; if $N_1 \geq N_0$, the controller sets $N_1$ indoor units to operate, and then sets the closed indoor units to enter the bypass mode one by one until $\Delta P \leq P_1$; if $N_0 > N_1$, the controller sets $N_1$ indoor units to operate, and directly sets $N_0 - N_1$ closed indoor units to enter the bypass mode; and then if still $\Delta P > P_1$, the controller sets the closed indoor units to enter the bypass mode one by one until $\Delta P \leq P_1$.

In some embodiments of the thermal cycle system, the predetermined bypass number $N_0$ accounts for 20%-50% of the total number of the plurality of indoor units.

In some embodiments of the thermal cycle system, said setting the closed indoor units to enter the bypass mode one by one includes: detecting at an interval of a first time $t_1$; and if $\Delta P \geq P_1$, setting one of the closed indoor units to enter the bypass mode until $\Delta P \leq P_1$.

In some embodiments of the thermal cycle system, the controller is preset with a second pressure offset threshold $P_2$ that is less than the first pressure offset threshold $P_1$, and the controller is configured to close the indoor units in the bypass mode one by one when $\Delta P < P_2$ until all the indoor units in the bypass mode are closed. In particular, the controller is configured to detect at an interval of a second time $t_2$; if $\Delta P < P_2$, the opening degree of the bypass valve is less than a predetermined value and there exist indoor units in the bypass mode, then one of the indoor units in the bypass mode is closed until all the indoor units in the bypass mode are closed.

In some embodiments of the thermal cycle system, the indoor unit includes a heat exchanger and a fan, and the bypass mode is a mode in which a cooling medium flows through the heat exchanger of the indoor unit and the fan of the indoor unit is not operated, or the bypass mode is a mode in which a valve on a direct-through flow path between a fluid inlet and a fluid outlet of the indoor unit is opened. In particular, the cooling medium is water.

In another aspect, a control method for a thermal cycle system is provided, the thermal cycle system including: driving devices, one or a plurality of outdoor units, and a plurality of indoor units, which are connected by pipelines; a bypass pipeline connected in parallel with the plurality of indoor units, a bypass valve being disposed in the bypass pipeline; the method including: detecting a pressure difference $\Delta P_o$ across the plurality of outdoor units; calculating a pressure offset parameter $\Delta P = \Delta P_o - \Delta P_{set}$ and adjusting an opening degree of the bypass valve based on the pressure offset parameter $\Delta P$ so that the pressure offset parameter $\Delta P$ approaches zero, $\Delta P_{set}$ being a pressure difference set value; and setting a first pressure offset threshold $P_1$, and setting closed indoor units to enter a bypass mode one by one when $\Delta P > P_1$, until $\Delta P \leq P_1$.

In some embodiments of the method, the method further includes: setting a predetermined bypass number $N_0$ of the indoor units, and comparing a load-based operating number $N_1$ of the indoor units with the predetermined bypass number $N_0$ when $\Delta P > P_1$; if $N_1 \geq N_0$, setting $N_1$ indoor units to operate, and then setting the closed indoor units to enter the bypass mode one by one until $\Delta P \leq P_1$; if $N_0 > N_1$, setting $N_1$ indoor units to operate, and directly setting $N_0 - N_1$ closed indoor units to enter the bypass mode; and then if still $\Delta P > P_1$, setting the closed indoor units to enter the bypass mode one by one until $\Delta P \leq P_1$.

In some embodiments of the method, the predetermined bypass number $N_0$ accounts for 20%-50% of the total number of the plurality of indoor units.

In some embodiments of the method, the step of setting the closed indoor units to enter the bypass mode one by one includes: detecting at an interval of a first time $t_1$; and if $\Delta P > P_1$, setting one of the closed indoor units to enter the bypass mode until $\Delta P \leq P_1$.

In some embodiments of the method, the method includes: setting a second pressure offset threshold $P_2$ that is less than the first pressure offset threshold $P_1$, and closing the indoor units in the bypass mode one by one when $\Delta P<P_2$ until all the indoor units in the bypass mode are closed. In particular, the method includes: detecting at an interval of a second time $t_2$; if $\Delta P<P_2$, the opening degree of the bypass valve is less than a predetermined value and there exist indoor units in the bypass mode, closing one of the indoor units in the bypass mode until all the indoor units in the bypass mode are closed.

In some embodiments of the method, the bypass mode is a mode in which a cooling medium flows through a heat exchanger of the indoor unit and a fan of the indoor unit is not operated, or the bypass mode is a mode in which a valve on a direct-through flow path between a fluid inlet and a fluid outlet of the indoor unit is opened. In particular, the cooling medium is water.

BRIEF DESCRIPTION OF THE DRAWINGS

The content of the present disclosure will become easier to understand with reference to the accompanying drawings, in which.

DETAILED DESCRIPTION OF THE EMBODIMENT(S) OF THE INVENTION

Figure 1:
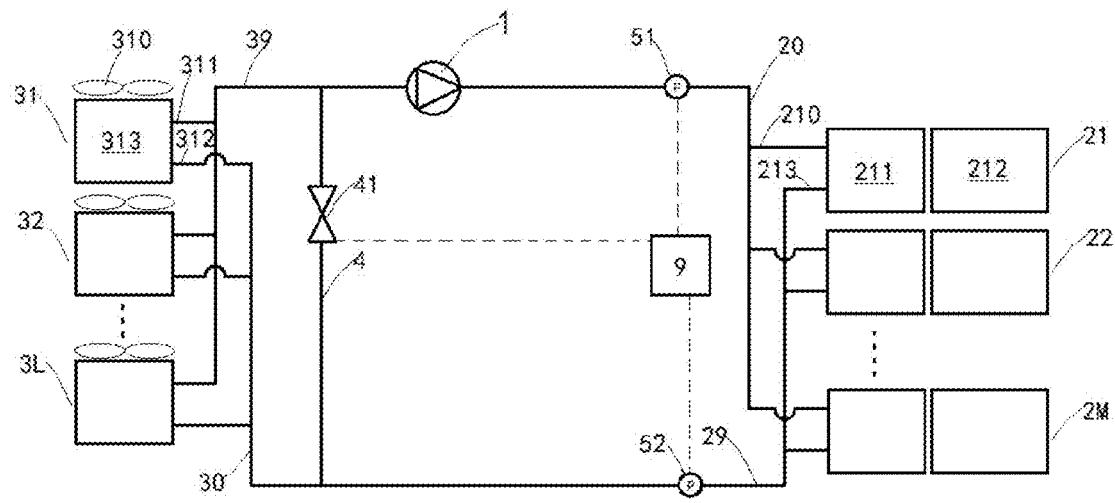
FIG. 1 shows a schematic structural diagram of a thermal cycle system according to an embodiment of the present disclosure.

Referring to FIG. 1, a thermal cycle system according to an embodiment of the present disclosure is shown. The thermal cycle system may include: a driving device 1 (such as a driving pump), one or a plurality of outdoor units 21, 22 . . . 2M, and a plurality of indoor units 31, 32 . . . 3L, which are connected by pipelines. A bypass pipeline 4 provided with a bypass valve 41 is connected in parallel with the plurality of indoor units 31, 32 . . . 3L. More specifically, the bypass pipeline 4 is disposed between an indoor unit inlet main pipeline 30 and an indoor unit outlet main pipeline 39 of the plurality of indoor units 31, 32 . . . 3L. A first pressure sensor 51 and a second pressure sensor 52 are disposed at two ends of the plurality of outdoor units 21, 22 . . . 2M respectively to sense a pressure difference $\Delta P_o$ across the plurality of outdoor units 21, 22 . . . 2M. The thermal cycle system further includes a controller 9, which may be associated with the bypass valve 41, the first pressure sensor 51 and the second pressure sensor 52. More specifically, the controller 9 receives pressure signals from the first pressure sensor 51 and the second pressure sensor 52 and controls an opening degree of the bypass valve 41. A cooling medium, such as water, flows in the thermal cycle system to adjust the temperature. In the illustrated embodiment, each outdoor unit may be connected, for example, in parallel between an outdoor unit inlet main pipeline 20 and an outdoor unit outlet main pipeline 29, and the first pressure sensor 51 and the second pressure sensor 52 are arranged in the outdoor unit inlet main pipeline 20 and the outdoor unit outlet main pipeline 29 respectively. Taking the first outdoor unit 21 as an example, it may include a heat exchanger 211 and an external circulation mechanism 212, which are connected to the outdoor unit inlet main pipeline 20 and the outdoor unit outlet main pipeline 29, and the heat exchanger 211 may be, for example, a brazed plate heat exchanger (BPHE) having an inlet 210 and an outlet 213 for the cooling medium. The heat exchanger 211 absorbs heat or cold from the refrigerant in the external circulation mechanism 212. The external circulation mechanism 212 may include a compressor, a heat exchanger, an expansion valve, a refrigerant, and the like. Each indoor unit may be connected in parallel between the indoor unit inlet main pipeline 30 and the indoor unit outlet main pipeline 39, and may include a heat exchanger 313 and a fan 310. An inlet 312 of the heat exchanger 313 such as a coil heat exchanger is connected to the indoor unit inlet main pipeline 30, and an outlet 311 of the heat exchanger 313 is connected to the indoor unit outlet main pipeline 39. In this type of thermal cycle system, if water is used as the cooling medium, there is a risk that the cooling medium will freeze when the flow rate of the fluid at the plurality of outdoor units is small, especially at low loads such as when the system has just been started. Therefore, the system generally includes an alarm system, which will send an alarm to notify the user when the flow rate of the fluid at the outdoor units less than, for example, 70% of the rated flow rate of the fluid, which will cause confusion to the customer and affect the user experience.

In the embodiment of the present disclosure, the controller 9 is preset with a pressure difference set value $\Delta P_{set}$, wherein the controller calculates a pressure offset parameter $\Delta P=\Delta P_o-\Delta P_{set}$ and adjusts an opening degree of the bypass valve 41 based on the pressure offset parameter $\Delta P$ so that the pressure offset parameter $\Delta P$ approaches zero. Specifically, when the pressure offset parameter $\Delta P$ is increased, the opening degree of the bypass valve 41 will be increased, thereby increasing a flow rate of the bypass fluid to increase a flow rate of the fluid passing through the outdoor units. Further, the controller 9 is preset with a first pressure offset threshold $P_1$, and the controller is configured such that closed indoor units enter a bypass mode one by one when $\Delta P>P_1$, until $\Delta P\leq P_1$. Generally, $\Delta P>P_1$ usually occurs when the opening degree of the bypass valve 41 has reached the maximum. At this point, the bypass valve 41 has no ability to cope with the further increase of $\Delta P$.

In some embodiments, the indoor unit 310 may include a heat exchanger 313 and a fan 310. The bypass mode is, for example, a mode in which the cooling medium flows through the heat exchanger 313 and the fan 310 is not operated. In some embodiments, a direct-through flow path having a valve may be provided between an inlet 312 and an outlet 311 of the heat exchanger 313 of the indoor unit 310, and the valve on the direct-through flow path is opened in the bypass mode so that at least part of the fluid passes directly through the direct-through flow path without passing through the heat exchanger 313.

In some embodiments, the controller 9 is preset with a predetermined bypass number $N_0$ of the indoor units, and the controller 9 is configured to compare a load-based operating number $N_1$ with the predetermined bypass number $N_0$ when $\Delta P>P_1$; if $N_1 \geq N_0$, the controller sets $N_1$ indoor units to operate, and then sets the closed indoor units to enter the bypass mode one by one until $\Delta P \leq P_1$; if $N_0>N_1$, the controller sets $N_1$ indoor units to operate, and directly sets $N_0-N_1$ closed indoor units to enter the bypass mode; and then if still $\Delta P>P_1$, the controller sets the closed indoor units to enter the bypass mode one by one until $\Delta P \leq P_1$. $N_1$ is the number of indoor units required to be operated determined by the controller of the thermal cycle system based on the current load situation. For the predetermined bypass number $N_0$, in some embodiments, it accounts for more than 20% of the total number L of the plurality of indoor units; more specifically, in some embodiments, the predetermined bypass number $N_0$ accounts for 20%-50% of the total number L of the plurality of indoor units; optionally, the predetermined bypass number $N_0$ accounts for 20%-30% of the total number L of the plurality of indoor units; optionally, the predetermined bypass number $N_0$ is 25% of the total number L of the plurality of indoor units when rounded; optionally, the predetermined bypass number $N_0$ is at least greater than three.

In some embodiments, the step of setting the closed indoor units to enter the bypass mode one by one includes: detecting at an interval of a first time $t_1$; and if $\Delta P > P_1$, setting one of the closed indoor units to enter the bypass mode until $\Delta P \leq P_1$. In some embodiments, the first time $t_1$ may be set based on a response time of the system; for example, the first time $t_1$ may be in a range from 5 seconds to 30 seconds, optionally in a range from 5 seconds to 15 seconds. Alternatively, in some embodiments, the first time $t_1$ may be set to 10 seconds.

In some embodiments, the controller 9 is preset with a second pressure offset threshold $P_2$ that is less than the first pressure offset threshold $P_1$, and the controller 9 is configured to close the indoor units in the bypass mode one by one when $\Delta P < P_2$ until all the indoor units in the bypass mode are closed. In some embodiments, the controller 9 is configured to detect at an interval of a second time $t_2$; if $\Delta P < P_2$, the opening degree of the bypass valve is less than a predetermined value and there exist indoor units in the bypass mode, then one of the indoor units in the bypass mode is closed until all the indoor units in the bypass mode are closed. Herein, if the opening degree of the bypass valve is less than a predetermined value M, for example, if is it less than 80% of the total opening degree of the bypass valve, then it is considered that the bypass valve now has the ability to cope with the increased flow rate caused by closing the bypass indoor units. In this case, closing the indoor units in the bypass mode will not cause an excessive reduction of the flow rate at the outdoor units, and repeated opening and closing of the indoor units is avoided. In addition, in some embodiments, the second time $t_2$ may be equal to the first time $t_2$, or may be different from the first time $t_2$.

Figure 2:
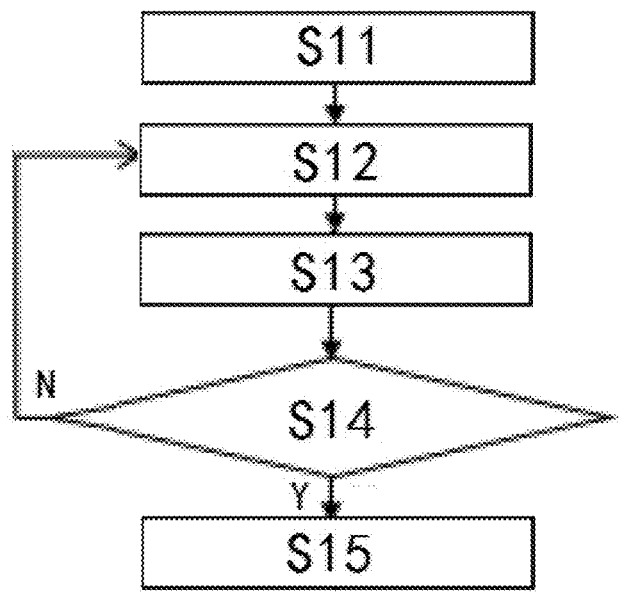
FIG. 2 to FIG. 4 show control logic diagrams of a method according to an embodiment of the present disclosure.

In another aspect, a control method for a thermal cycle system according to an embodiment of the present disclosure will be described with reference to FIG. 2 to FIG. 4. The control method may be applied to, for example, the thermal cycle system shown in FIG. 1. Referring to FIG. 2, the method includes: step S11: starting; step S12: detecting a pressure difference $\Delta P_o$ across the plurality of outdoor units; step S13: calculating a pressure offset parameter $\Delta P = \Delta P_o - \Delta P_{set}$ and adjusting an opening degree of the bypass valve based on the pressure offset parameter $\Delta P$ so that the pressure offset parameter $\Delta P$ approaches zero, $\Delta P_{set}$ being a pressure difference set value; step S14: setting a first pressure offset threshold $P_1$, and determining whether $\Delta P > P_1$; if yes, step S15 is executed to set the closed indoor units to enter the bypass mode one by one until $\Delta P \leq P_1$; and if not, the process returns to step S12; for example, the updated pressure difference $\Delta P_o$ is collected again at a certain interval.

Figure 3:
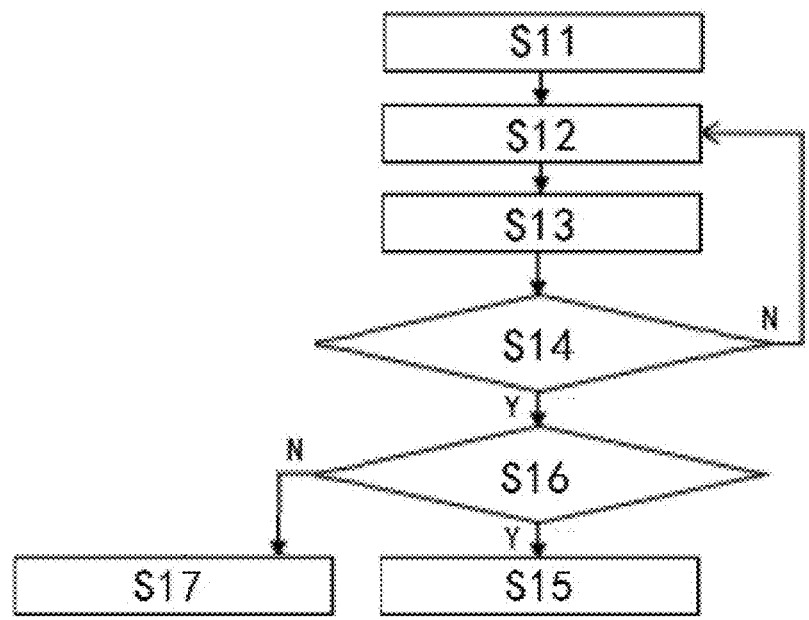

With continued reference to FIG. 3, in a further embodiment, the method further includes: setting a predetermined bypass number $N_0$ of the indoor units; wherein if $\Delta P > P_1$ in S14, then it is determined in step S16 whether $N_1 \geq N_0$; if $N_1 \geq N_0$, step S15 is executed to set $N_1$ indoor units to operate, and then set the closed indoor units to enter the bypass mode one by one until $\Delta P \leq P_1$; if not, step S17 is executed to set $N_1$ indoor units to operate when $N_0 > N_1$, and directly set $N_0 - N_1$ closed indoor units to enter the bypass mode; and then if still $\Delta P > P_1$, the closed indoor units are set to enter the bypass mode one by one until $\Delta P \leq P_1$. In some embodiments, the step of setting the closed indoor units to enter the bypass mode one by one mentioned in steps S15 and S17 includes: detecting at an interval of a first time $t_1$; and if $\Delta P > P_1$, setting one of the closed indoor units to enter the bypass mode until $\Delta P \leq P_1$.

Figure 4:
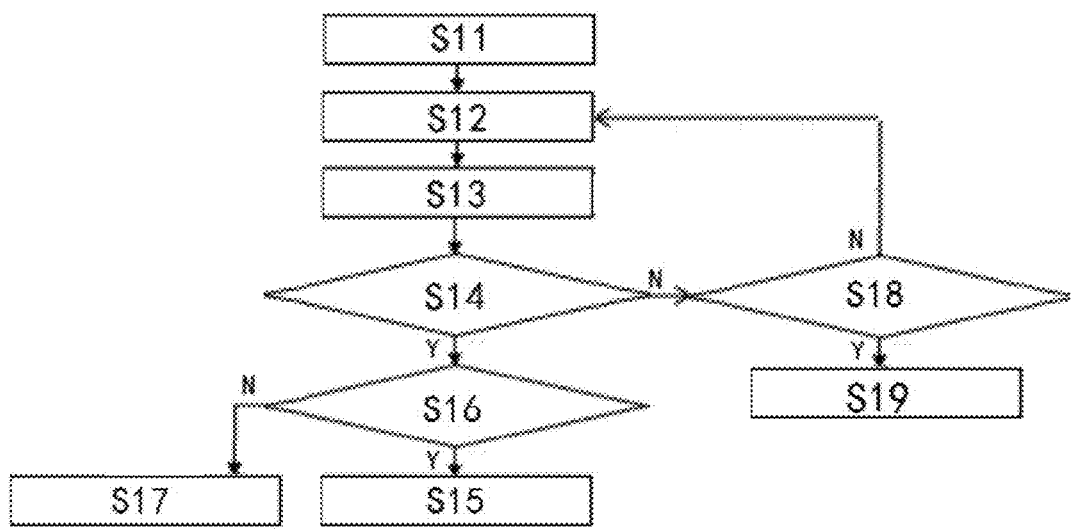

With continued reference to FIG. 4, in this embodiment, it is determined in step S14 whether $\Delta P > P_1$; if not, step S18 is executed, which includes: setting a second pressure offset threshold $P_2$ that is less than the first pressure offset threshold $P_1$, and determining whether $\Delta P < P_2$; if yes, step S19 is executed to close the indoor units in the bypass mode one by one until all the indoor units in the bypass mode are closed; and if not, the process returns to step S12 and the updated pressure difference $\Delta P_o$ is collected again at a certain interval. In particular, the method includes: detecting at an interval of a second time $t_2$; if $\Delta P < P_2$, the opening degree of the bypass valve is less than a predetermined value and there exist indoor units in the bypass mode, closing one of the indoor units in the bypass mode until all the indoor units in the bypass mode are closed.

The device and method according to the embodiments of the present disclosure can be adaptively adjusted to ensure the flow rate of the cooling medium flowing through the outdoors unit and avoid situations such as freezing of the cooling medium or system alarm caused by the excessively low flow rate of the cooling medium.

The specific embodiments described above are merely for describing the principle of the present disclosure more clearly, and various components are clearly illustrated or depicted to make it easier to understand the principle of the present disclosure. Those skilled in the art can readily make various modifications or changes to the present disclosure without departing from the scope of the present disclosure. Therefore, it should be understood that these modifications or changes should be included within the scope of protection of the present disclosure.

What is claimed is:

1. A thermal cycle system, comprising:
   driving devices, one or a plurality of outdoor units, and a plurality of indoor units, which are connected by pipelines;
   a bypass pipeline for the plurality of indoor units, a bypass valve being disposed in the bypass pipeline;
   a pressure sensor that senses a pressure difference $\Delta P_o$ across the plurality of outdoor units; and
   a controller that is preset with a pressure difference set value $\Delta P_{set}$, wherein the controller calculates a pressure offset parameter $\Delta P = \Delta P_o - P_{set}$ and adjusts an opening degree of the bypass valve based on the pressure offset parameter $\Delta P$ so that the pressure offset parameter $\Delta P$ approaches zero, and
   wherein the controller is preset with a first pressure offset threshold $P_1$, and the controller is configured such that closed indoor units enter a bypass mode one by one when $\Delta P > P_1$, until $\Delta P \leq P_1$;
   wherein the indoor unit comprises a heat exchanger and a fan, and the bypass mode is a mode in which a cooling medium flows through the heat exchanger of the indoor unit and the fan of the indoor unit is not operated, or
   wherein the bypass mode is a mode in which a valve on a direct-through flow path between a fluid inlet and a fluid outlet of the indoor unit is opened.

2. The thermal cycle system according to claim 1, wherein the controller is preset with a predetermined bypass number $N_0$ of the indoor units, and the controller is configured to compare a load-based operating number $N_1$ of the indoor units with the predetermined bypass number $N_0$ when $\Delta P > P_1$; if $N_1 \geq N_0$, the controller sets $N_1$ indoor units to operate, and then sets the closed indoor units to enter the bypass mode one by one until $\Delta P \leq P_1$; if $N_0 > N_1$, the controller sets $N_1$ indoor units to operate, and directly sets $N_0-N_1$ closed indoor units to enter the bypass mode; and then if still $\Delta P > P_1$, the controller sets the closed indoor units to enter the bypass mode one by one until $\Delta P \leq P_1$.

3. The thermal cycle system according to claim 2, wherein the predetermined bypass number No accounts for 20%-50% of the total number of the plurality of indoor units.

4. The thermal cycle system according to claim 1, wherein said setting the closed indoor units to enter the bypass mode one by one comprises: detecting at an interval of a first time $t_1$; and if $\Delta P > P_1$, setting one of the closed indoor units to enter the bypass mode until $\Delta P \leq P_1$.

5. The thermal cycle system according to claim 1, wherein the controller is preset with a second pressure offset threshold $P_2$ that is less than the first pressure offset threshold $P_1$, and the controller is configured to close the indoor units in the bypass mode one by one when $\Delta P < P_2$ until all the indoor units in the bypass mode are closed; in particular, the controller is configured to detect at an interval of a second time $t_2$; if $\Delta P < P_2$, the opening degree of the bypass valve is less than a predetermined value and there exist indoor units in the bypass mode, then one of the indoor units in the bypass mode is closed until all the indoor units in the bypass mode are closed.

6. The thermal cycle system according to claim 1, wherein the cooling medium is water.

7. A control method for a thermal cycle system, the thermal cycle system comprising: driving devices, one or a plurality of outdoor units, and a plurality of indoor units, which are connected by pipelines; a bypass pipeline connected in parallel with the plurality of indoor units, a bypass valve being disposed in the bypass pipeline, the method comprising:
 detecting a pressure difference $\Delta P_0$ across the plurality of outdoor units;
 calculating a pressure offset parameter $\Delta P = \Delta P_0 - P_{set}$ and adjusting an opening degree of the bypass valve based on the pressure offset parameter $\Delta P$ so that the pressure offset parameter $\Delta P$ approaches zero, $\Delta P_{set}$ being a pressure difference set value; and
 setting a first pressure offset threshold $P_1$, and setting closed indoor units to enter a bypass mode one by one when $\Delta P > P_1$, until $\Delta P < P_1$;
 wherein the bypass mode is a mode in which a cooling medium flows through a heat exchanger of the indoor unit and a fan of the indoor unit is not operated, or
 wherein the bypass mode is a mode in which a valve on a direct-through flow path between a fluid inlet and a fluid outlet of the indoor unit is opened.

8. The method according to claim 7, further comprising: setting a predetermined bypass number No of the indoor units, and comparing a load-based operating number $N_1$ of the indoor units with the predetermined bypass number $N_0$ when $\Delta P > P_1$; if $N_1 \geq N_0$, setting $N_1$ indoor units to operate, and then setting the closed indoor units to enter the bypass mode one by one until $\Delta P \leq P_1$; if $N_0 > N_1$, setting $N_1$ indoor units to operate, and directly setting $N_0-N_1$ closed indoor units to enter the bypass mode; and then if still $\Delta P > P_1$, setting the closed indoor units to enter the bypass mode one by one until $\Delta P \leq P_1$.

9. The method according to claim 8, wherein the predetermined bypass number No accounts for 20%-50% of the total number of the plurality of indoor units.

10. The method according to claim 7, wherein of setting the closed indoor units to enter the bypass mode one by one comprises: detecting at an interval of a first time $t_1$; and if $\Delta P > P_1$, setting one of the closed indoor units to enter the bypass mode until $\Delta P \leq P_1$.

11. The method according to claim 7, comprising: setting a second pressure offset threshold $P_2$ that is less than the first pressure offset threshold $P_1$, and closing the indoor units in the bypass mode one by one when $\Delta P < P_2$ until all the indoor units in the bypass mode are closed; in particular, the method comprises: detecting at an interval of a second time $t_2$; if $\Delta P < P_2$, the opening degree of the bypass valve is less than a predetermined value and there exist indoor units in the bypass mode, closing one of the indoor units in the bypass mode until all the indoor units in the bypass mode are closed.

12. The method according to claim 7, wherein the cooling medium is water.

\* \* \* \* \*